(12) United States Patent
Truong (10) Patent No.: US 8,803,900 B2
(45) Date of Patent: Aug. 12, 2014

(54) SYNCHRONIZATION WITH SEMAPHORES IN A MULTI-ENGINE GPU

(75) Inventor: Pat Truong, Mississauga (CA)

(73) Assignee: ATI Technologies ULC, Markham, Ontario (CA)

(*) Notice: Subject to any disclaimer, the term of this patent is extended or adjusted under 35 U.S.C. 154(b) by 254 days.

(21) Appl. No.: 13/334,684

(22) Filed: Dec. 22, 2011

(65) Prior Publication Data

US 2013/0162658 A1 Jun. 27, 2013

(51) Int. Cl.
*G09G 5/36* (2006.01)
*G06F 9/46* (2006.01)

(52) U.S. Cl.
USPC .......................................... 345/558; 718/106

(58) Field of Classification Search
CPC ................ G06F 9/52; G06F 3/0649
USPC ......................................... 718/106; 345/558
See application file for complete search history.

(56) References Cited

U.S. PATENT DOCUMENTS

| | | | | |
|---|---|---|---|---|
| 6,725,457 B1* | 4/2004 | Priem et al. | .................... | 718/104 |
| 7,321,369 B2* | 1/2008 | Wyatt et al. | .................... | 345/556 |
| 7,697,007 B1* | 4/2010 | Duluk, Jr. | .................... | 345/522 |
| 2007/0245130 A1* | 10/2007 | Stuttard et al. | ................ | 712/220 |
| 2008/0266302 A1* | 10/2008 | Andre et al. | .................... | 345/519 |
| 2009/0172676 A1* | 7/2009 | Jiang et al. | .................... | 718/101 |

* cited by examiner

*Primary Examiner* — Kee M Tung
*Assistant Examiner* — Nicholas R Wilson
(74) *Attorney, Agent, or Firm* — Volpe and Koenig, P.C.

(57) ABSTRACT

A method for performing an operation using more than one resource may include several steps: requesting an operation performed by a resource; populating a ring frame with an indirect buffer command packet corresponding to the operation using a method that may include for the resource requested to perform the operation, creating a semaphore object with a resource identifier and timestamp, in the event that the resource is found to be unavailable; inserting a command packet (wait) into the ring frame, wherein the command packet (wait) corresponds to the semaphore object; and submitting the ring frame to the graphics engine.

13 Claims, 7 Drawing Sheets

SYNCHRONIZATION WITH SEMAPHORES IN A MULTI-ENGINE GPU

FIELD OF THE INVENTION

This application relates to resource management using semaphores in a multi-engine processor.

BACKGROUND

Figure 1:
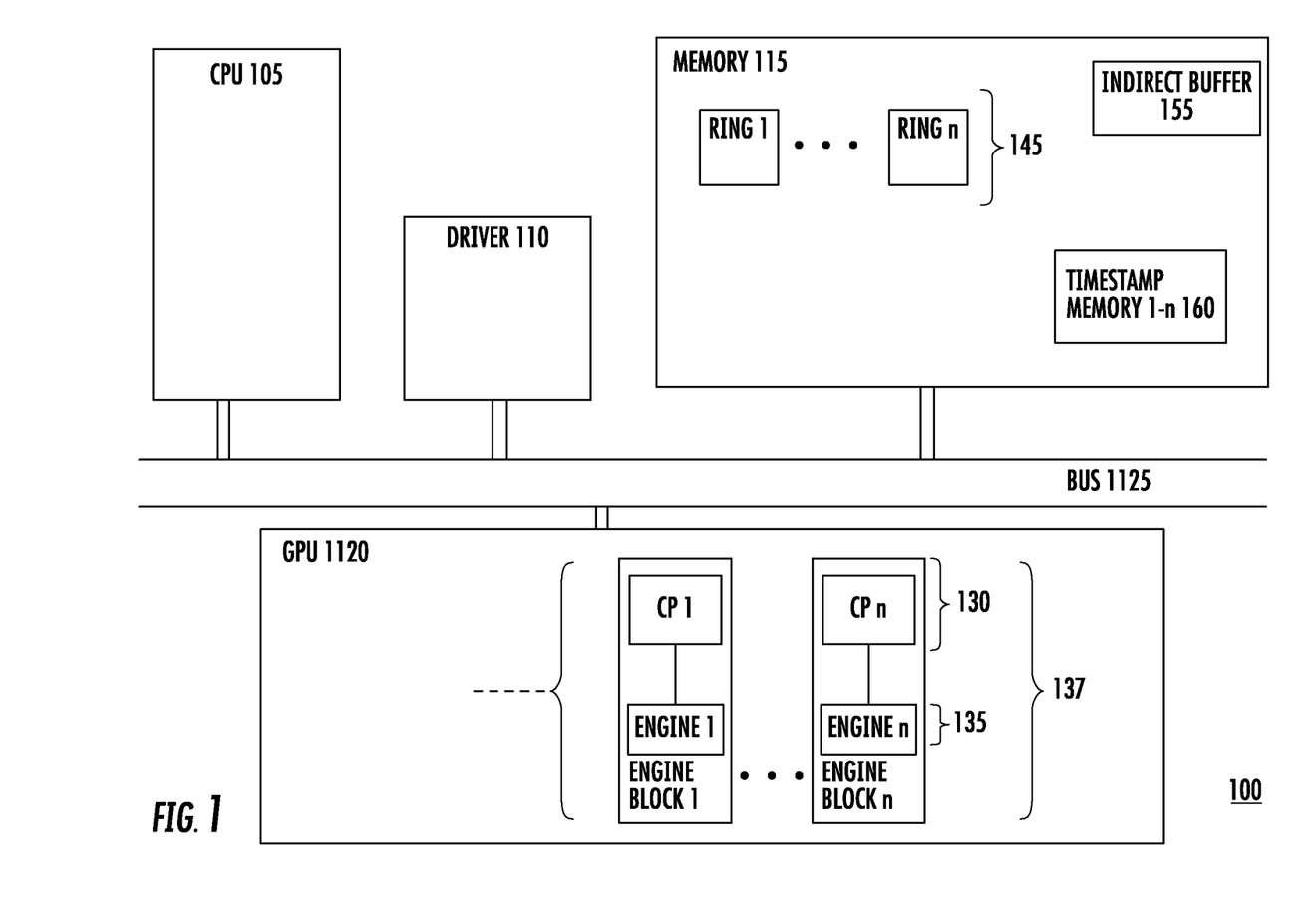
FIG. 1 is an example block diagram of a system that could be used with the disclosed embodiments.

FIG. 1 is a block diagram of an example graphics processing system 100 or device in which one or more disclosed embodiments may be implemented. The system 100 may be, for example, a computer, a gaming device, a handheld device, a set-top box, a television, a mobile phone, or a tablet computer. The system 100 may include a central processing unit (CPU) 105, a system memory 115, a graphics driver 110 (although as discussed below, multiple graphics drivers are contemplated), a graphics processing unit (GPU) 120, and a communication infrastructure 125. A person of skill in the art will appreciate that system may include software, hardware, and firmware components in addition to, or different from, that shown in FIG. 1. It is understood that the system may include additional components not shown in FIG. 1.

The CPU 105 and GPU 120 may be located on the same die (accelerated processing unit, APU). The CPU 105 may be any commercially available CPU, a digital signal processor (DSP), application specific integrated processor (ASIC), field programmable gate array (FPGA), or a customized processor. The CPU 105 and/or GPU 120 may comprise of one or more processors coupled using a communication infrastructure, such as communication infrastructure 125. The CPU 105 and/or GPU 120 may also include one or more processors that have more than one processing core on the same die such as a multi-core processor. The memory 115 may be located on the same die as the CPU 105 and/or GPU 120, or may be located separately from the CPU 105 and/or GPU 120. The memory 115 may include a volatile or non-volatile memory, for example, random access memory (RAM), dynamic RAM, or a cache.

The CPU 105 may execute an operating system (not shown) and one or more applications, and is the control processor for the system. The operating system executing on CPU 105 may control, facilitate access and coordinate the accomplishment of tasks with respect to system.

The graphics driver 110 may comprise software, firmware, hardware, or any combination thereof. In an embodiment, the graphics driver 110 may be implemented entirely in software. The graphics driver 110 may provide an interface and/or application programming interface (API) for the CPU 105 and applications executing on the CPU 105 to access the GPU 120. As described above and herein, there may be more than one graphics driver 110, although only one is shown.

The communication infrastructure 125 may provide coupling between the components of system and may include one or more communication buses such as Peripheral Component Interconnect (PCI), Advanced Graphics Port (AGP), and the like.

The GPU 120 provides graphics acceleration functionality and other compute functionality to system 100. The GPU 120 may include multiple command processors (CP) CP 1 ... CP n 130, multiple graphics engines (Engines) Engine 1 ... Engine n 135, for example, 3D engines, unified video decoder (UVD) engines, or digital rights management (DRM) direct memory access (DMA) engines. GPU 120 may include a plurality of processors including processing elements such as arithmetic and logic units (ALU). It is understood that the GPU 120 may include additional components not shown in FIG. 1.

The CP 1 ... CP n 130 may control the processing within GPU 120 and may be connected to Engine 1 ... Engine n 135. Each CP 1 ... CP n 130 may be associated with Engine 1 ... Engine n 135 and each pair is an engine block (EB) EB 1 ... EB n 137. In another embodiment, the CP 1 ... CP n 130 may be a single command processor. In general, the CP 1 ... CP n 130 receives instructions to be executed from the CPU 105, and may coordinate the execution of those instructions on Engine 1 ... Engine n 135 in GPU 120. In some instances, the CP 1 ... CP n 130 may generate one or more commands to be executed in GPU 120, that correspond to each command received from CPU 105. Logic instructions implementing the functionality of the CP 1 ... CP n 130 may be implemented in hardware, firmware, or software, or a combination thereof.

The memory 115 may include a one or more memory devices and may be a dynamic random access memory (DRAM) or a similar memory device used for non-persistent storage of data. The memory 115 may include a timestamp memory 1-n 160 (corresponding to driver(s)) and indirect buffers 155. During execution, memory 115 may have residing within it, one or more memory buffers 145 through which CPU 105 communicates commands to GPU 120.

The memory buffers 145 may correspond to the graphics engines 135 or the engine blocks 137, as appropriate. Memory buffers 145 may be ring buffers or other data structures suitable for efficient queuing of work items or command packets. In the instance of a ring buffer, command packets may be placed into and taken away from the memory buffers 145 in a circular manner. For purposes of illustration, memory buffers 145 may be referred to as ring buffers 145 herein.

The indirect buffers 155 may be used to hold the actual commands, (e.g., instructions and data). For example, when CPU 105 communicates a command packet to the GPU 120, the command packet may be stored in an indirect buffer 155 and a pointer to that indirect buffer 155 may be inserted in a ring buffer 145. As described herein below with respect to FIG. 2, the CPU 105, via driver 110, as writer of the commands to ring buffers 145 and GPU 120 as a reader of such commands may coordinate a write pointer and read pointer indicating the last item added, and last item read, respectively, in ring buffers 145.

An operation, for example a drawing operation, may require multiple resources. These resources may be associated with more than one operation or graphics engine. When executing such an operation, there are several solutions for buffering the requests for the resources.

When a processor becomes backlogged with the requests, it can store the requests for later execution—or even later overwrite, in a buffer, or more particularly a ring buffer. One advantage of a ring buffer is that it does not need to have its command packets shuffled around when one is consumed. This contrasts with non-ring buffers, where it is necessary to shift all packets when one is consumed. Said another way, the ring buffer is well-suited as a FIFO buffer while a standard, non-ring buffer is well-suited as a LIFO buffer.

Another memory management tool is the semaphore, which controls access to a common resource. It does this by acting as the gatekeeper to the resource, and noting how much of the resource is free after each processor accesses the resource (or frees up a resource when done). If the resource is free, the semaphore permits the next process to access the resource. If not, the semaphore directs the process to wait.

These memory management tools create long wait times if the resource is fully used, and the memory and thread use in the ring buffer may also take up resources. This wait time and memory usage may create performance issues for multiple engines that share the resources.

SUMMARY

A method for performing an operation using more than one resource may include several steps, not necessarily in this order. First, requesting an operation performed by a resource. Second, populating a ring frame with an indirect buffer command packet corresponding to the operation using a method that may include for the resource requested to perform the operation, creating a semaphore object with a resource identifier and timestamp, in the event that the resource is found to be unavailable; inserting a command packet (wait) into the ring frame, wherein the command packet (wait) corresponds to the semaphore object; and submitting the ring frame to the graphics engine.

BRIEF DESCRIPTION OF THE DRAWINGS

A more detailed understanding may be had from the following description, given by way of example in conjunction with the accompanying drawings wherein:

FIG. 5 (which is split as FIGS. 5A and 5B across pages) shows a flowchart for creation of a ring frame for submission to a GPU.

DETAILED DESCRIPTION

Figure 2:
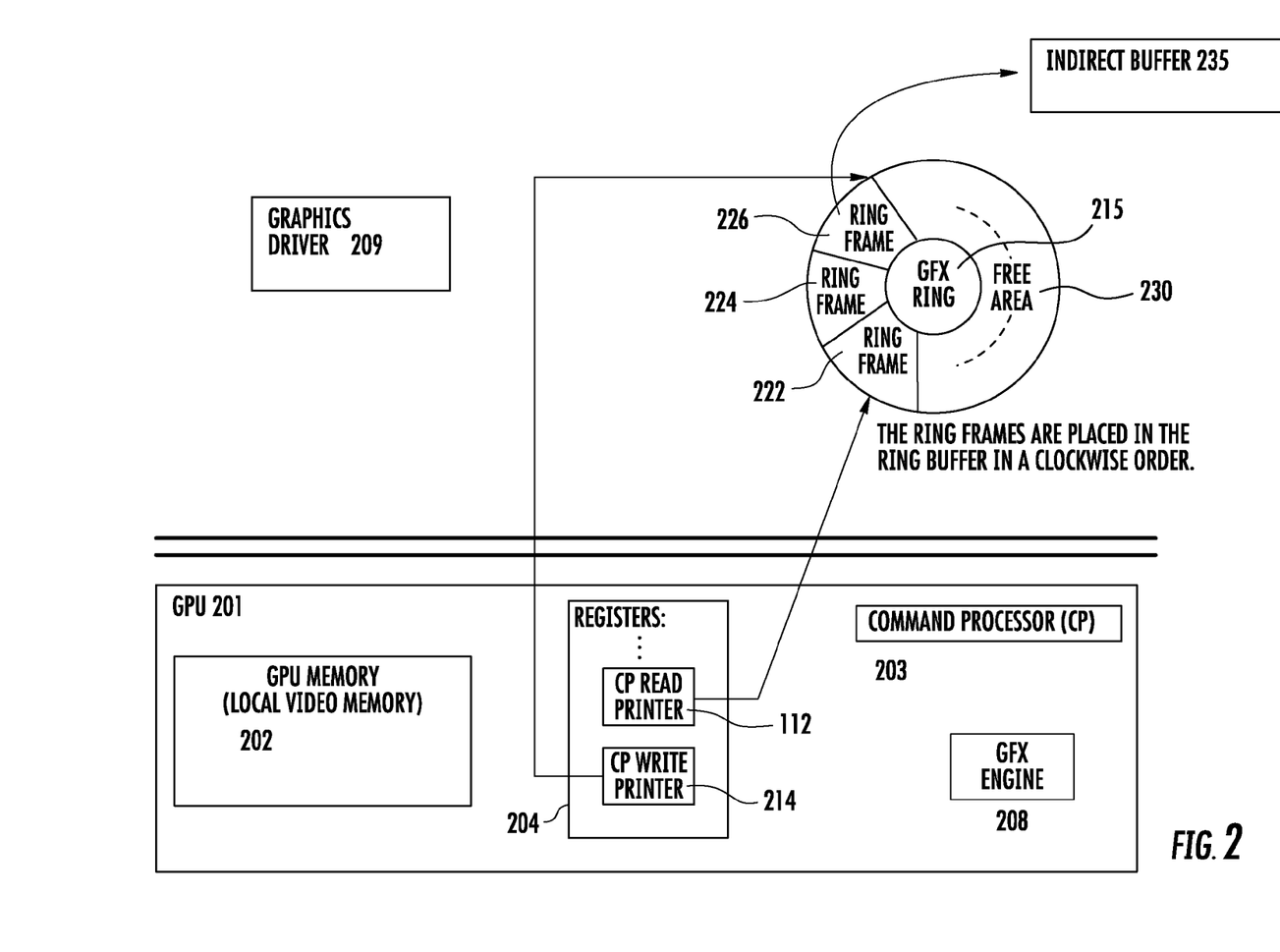
FIG. 2 is an example block diagram of command packet processing.

FIG. 2 is an example block diagram of command packet processing between a GPU 201, a graphics driver 209, an engine ring 215, and indirect buffer 235. The GPU 201 includes a GPU memory 202, registers 204, a command processor 203, and a graphics engine (GFX) 208.

Figure 2A:
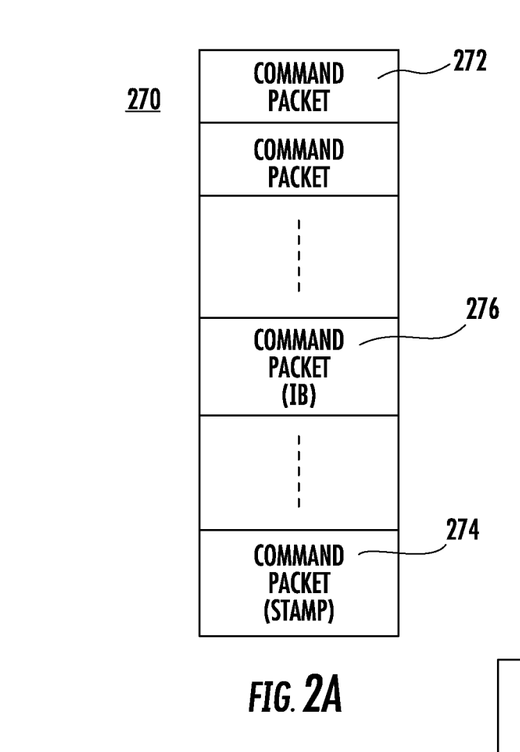
FIG. 2A is an example ring frame.
Figure 2B:
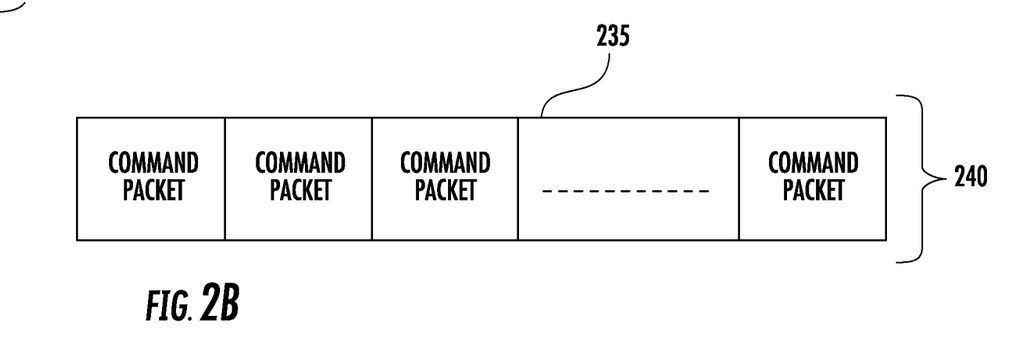
FIG. 2B is an example indirect buffer.

The registers 204 include a read pointer 212 and a write pointer 214. The engine ring 215 may include ring frames 222, 224, 226, and free space 232. FIG. 2A shows an example ring frame 270 that may include a plurality of command packets 272, a timestamp command packet 274, and an indirect buffer (IB) command packet 276 that points to the indirect buffer 235. The indirect buffer 235, as shown in FIG. 2B, may include a plurality of command packets 240 that instruct the GPU 201 to carry out operations such as drawing an object to memory.

The above architecture may provide a one-way communication from a host processor, (the writer as represented by driver 209), to the GPU 201, (the reader as represented by the command processor 203). Initially, the read pointer 212 and the write pointer 214 point to the same location indicating that GFX ring 215 is empty. The GFX ring 215 has free space 232 into which the driver 209 may write a command packet corresponding to a task. The driver 209 then updates the write pointer 214 to one position past the last command packet 226 or the first available space. Following the update, the write pointer 214 and read pointer 212 point to different locations. The command processor 203 may fetch command packets at the read pointer 212 position and walk the read pointer 212 until it is equal to the write pointer 214.

For a GPU 201 with multiple engines and each engine running concurrently with another, semaphores may be used to control access by multiple engines to a common resource. An example of a scenario where this control is necessary is when there are two drawing operations that use the same piece of memory (resource). For simplicity, the first drawing operation may fill a small area of memory with zero and this drawing operation is submitted to Engine A. The second drawing operation may access the content of the memory and convert zero to one and this operation may be submitted to Engine B. In this case, a semaphore may be used to ensure that Engine B will not start executing the second drawing operation until the first drawing operation is completed by Engine A.

Figure 3:
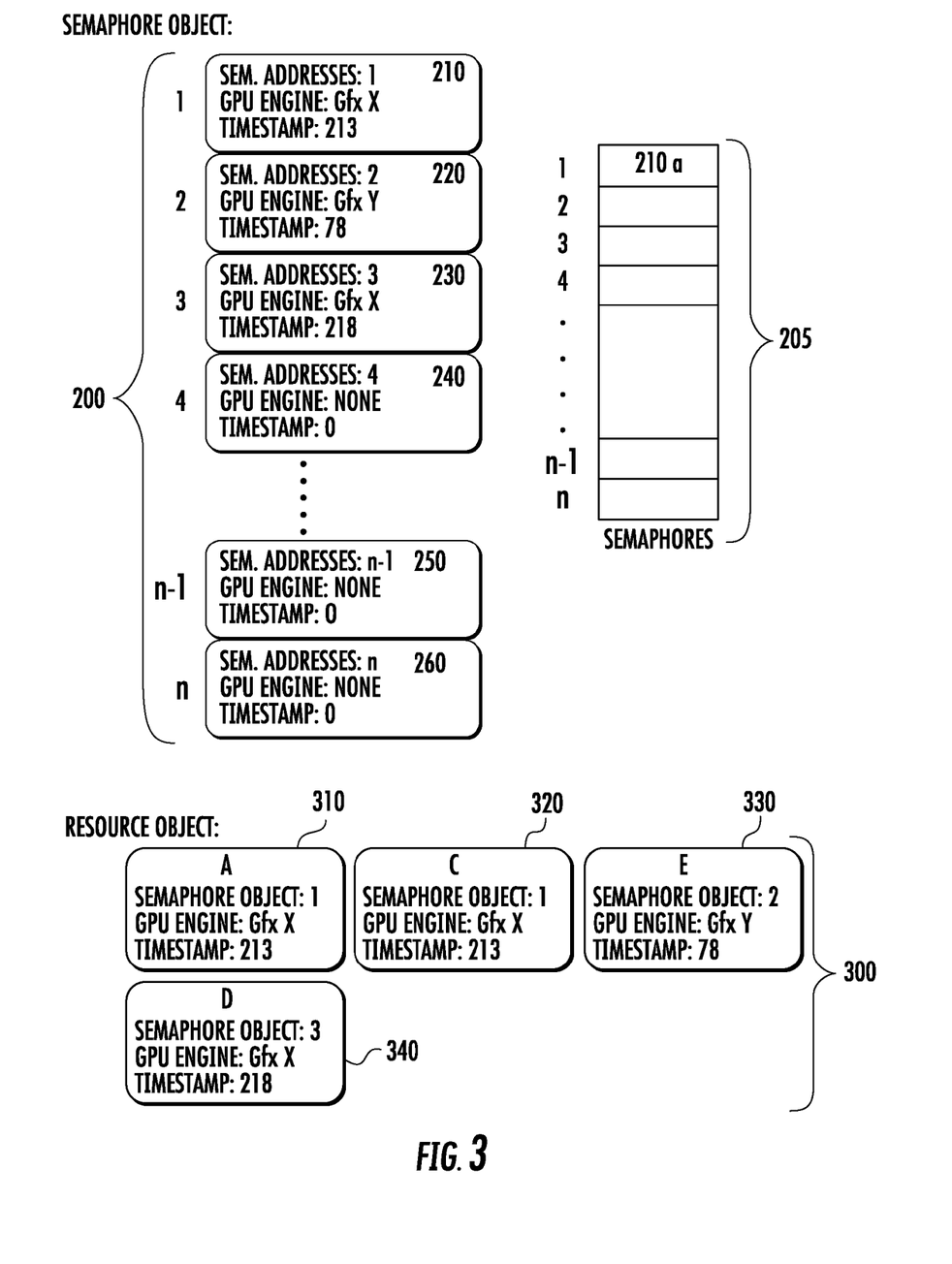
FIG. 3 shows an example of semaphore and resource objects at one point in time.

FIG. 3 shows an illustration of semaphore objects 200, semaphores 205, and resource objects 300 at a certain point in time, after one or more earlier operations have taken place using GPU Engine Gfx X and Gfx Y. In the semaphore objects 200, certain records or individual objects are shown as reference numbers 210, 220, 230, 240, 250, and 260. These objects contain corresponding information related to the semaphores 205. For example, semaphore object 210 has a semaphore address 1 as shown, and is thus related to semaphore 1, 210a, with similar relationships existing between semaphore objects 200 and semaphores 205. In addition to its semaphore relationship, each semaphore object 200 may also contain engine use information (in this example, a resource identifier for GPU Engine Gfx X or Gfx Y) and timestamp information. Within the resource and semaphore objects, the GPU engine field identifies the last engine the resource object 300 or semaphore object 200 was used by. The timestamp field identifies the stamp assigned to the operation that requires the resource or semaphore object.

Each resource object 300 may be associated with one or more resources, for example A, C, D, and E. In this example, resources A, C, D, and E are associated with resource objects A 310, C 320, D 340, and E 330. Resource objects may contain various information but for the sake of FIG. 3, we will focus its semaphore object relationship, engine last use information (in this example GPU Engine Gfx X or Gfx Y), and timestamp information. It should be appreciated that each resource object 300 has a corresponding semaphore object 200, with resource object 320 corresponding to semaphore object 210, 330 with 220 and so on.

Figure 4:
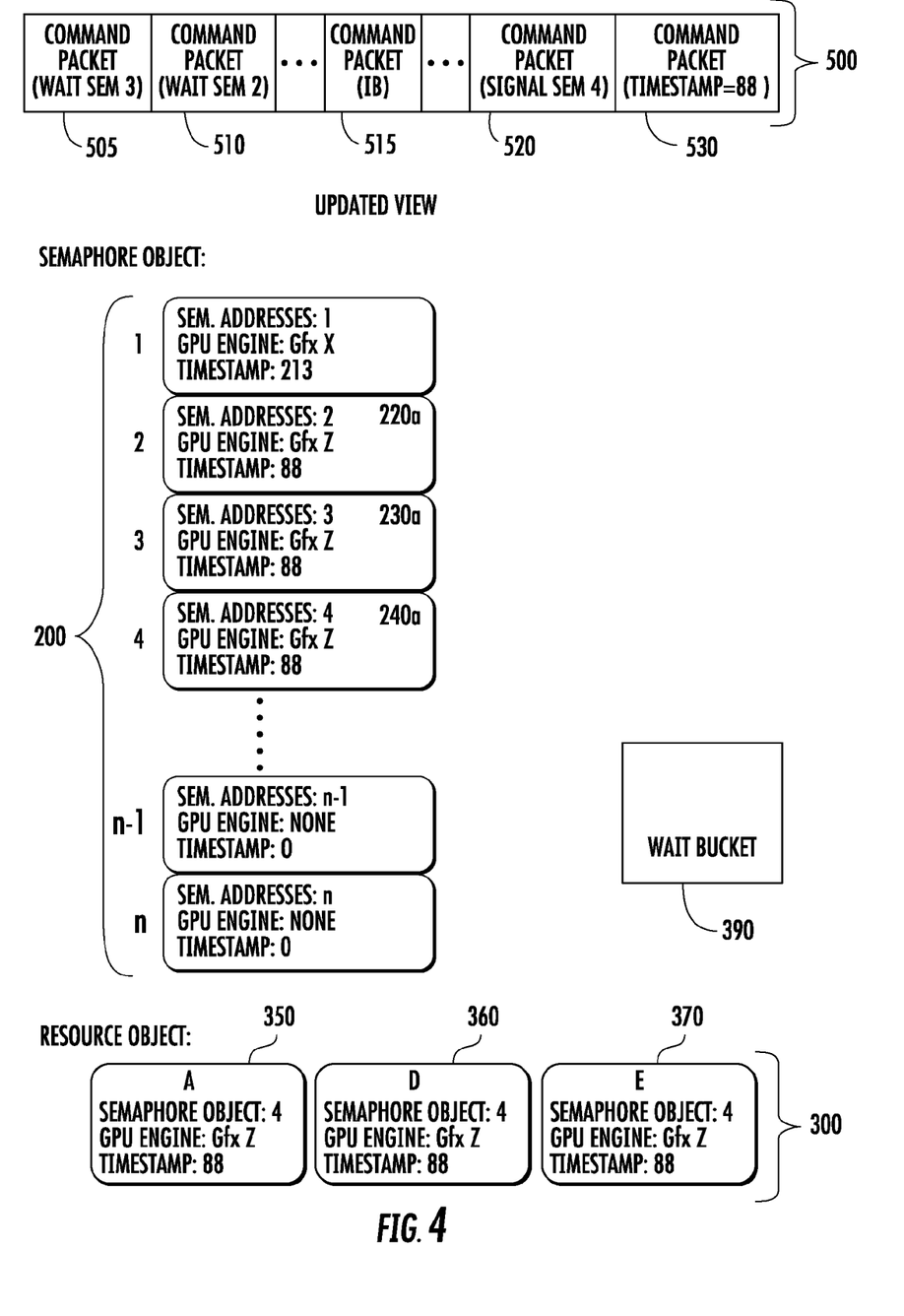
FIG. 4 shows an example of semaphore and resource objects at another point in time.
Figure 5A:
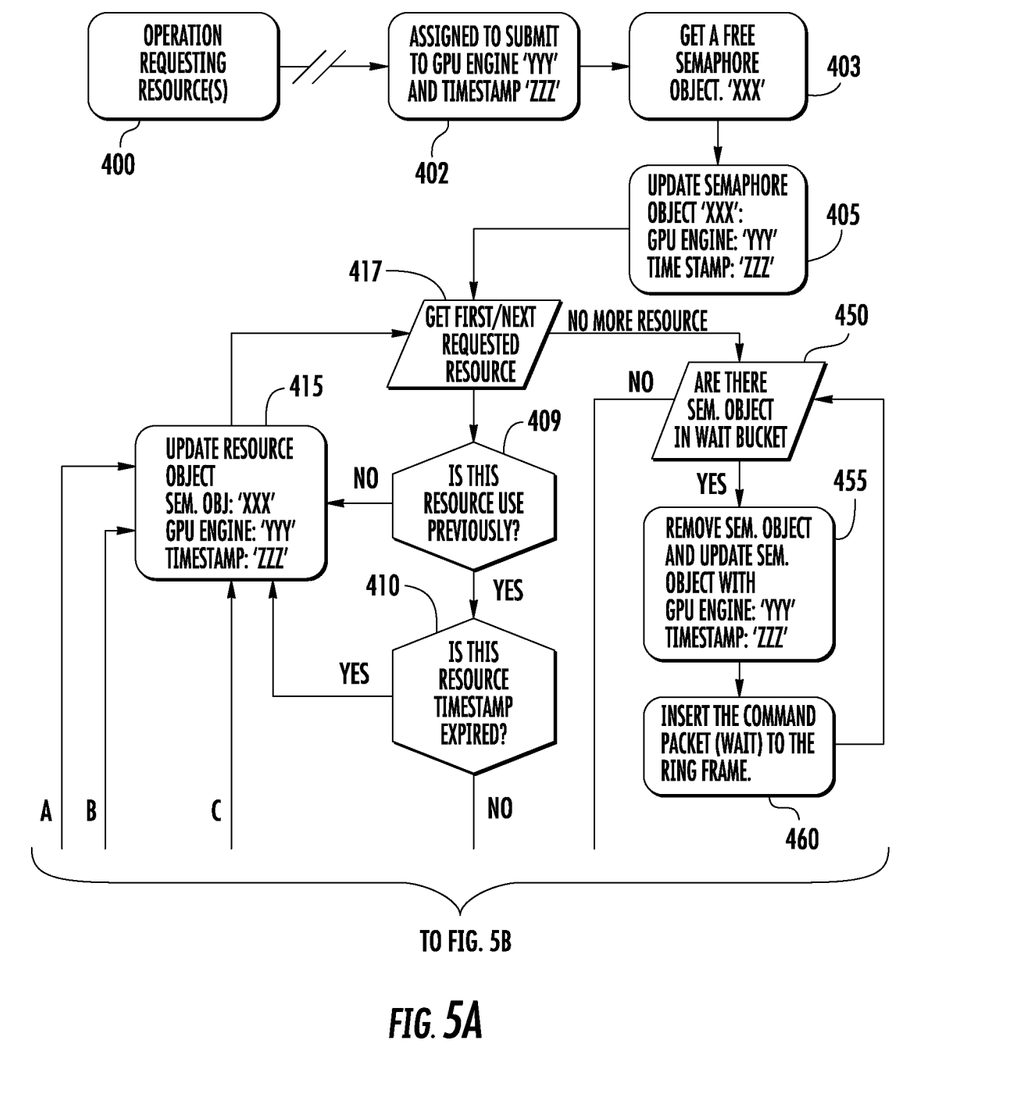
Figure 5B:
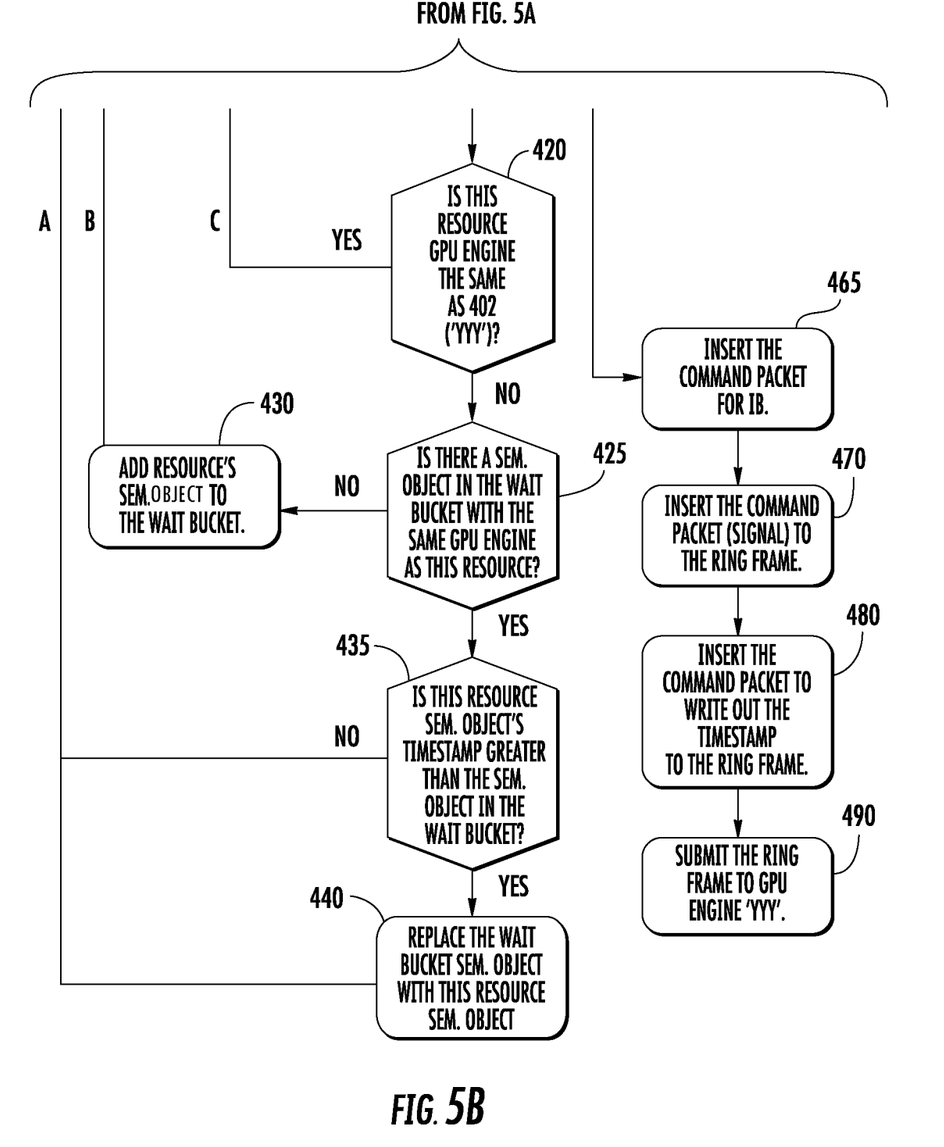

FIG. 4, in conjunction with FIG. 5, shows an example of how an operation (for example a drawing operation) that requires resources A, D, and E for a graphics engine Gfx Z with a timestamp 88 might create a ring frame 500 for submission to the GPU, where the indirect buffer 515 (that contains command packets to perform a task or drawing operation) is submitted to an engine. As considered in the example, there may be multiple GPU Engines (Gfx X, Gfx Y, and Gfx Z) that are competing for the same resources A, D, and E.

FIG. 5 shows a general logic sequence, carried out for example in a graphics driver 110, for dealing with this competition through submission of a ring frame 500 that includes the command packets associated with the operation to a GPU, while FIG. 4 shows the resource objects 300, semaphore objects 200, and ring frame 500 during the process of creating the ring frame 500.

For the drawing operation assigned to submit to Gfx Z with the timestamp 88 (the next incremental timestamp of Gfx Z) that needs resources A, D, and E, the graphics driver may follow the process shown in the flow chart in FIG. 5, starting with the operation request itself in step 400 and the operation assigned to submit to GPU Engine Gfx Z and timestamp 88 in step 402. Following step 402, at step 403 and 405, the driver may update a free semaphore object (object 4, item 240 from FIG. 3) the GPU Engine (Gfx Z) and timestamp (88) from step 402. This updated semaphore object is shown in FIG. 4 as reference 240a.

Following step 405, the driver may determine whether there are resource requested (step 417). There should be at minimum one resource requested. If there is no more resource, the process proceeds to step 450 that will be discussed in more detail below. And if the answer is YES, the driver determines whether the resource requested was used previously (step 409).

For a resource requested that was not used previously, a blank resource object 300 is created with null or blank values for the semaphore object, GPU Engine, and timestamp fields.

If the answer to step 409 is NO, i.e., the resource requested was not used previously, the process proceeds to step 415. If the answer to step 409 is YES, however, a determination is made as to whether this resource (object A, item 310 from FIG. 3) has an expired timestamp (step 410). For the sake of this example, assume the current timestamps for Gfx X, Gfx Y, and Gfx Z are 212, 87, and 75 respectively, and because this resource object A has a timestamp of 213, the answer is NO. If it had expired, the process proceeds to step 415. Since it is not expired, the logic moves to step 420 and checks whether this resource object A GPU Engine is the same as the assigned GPU Engine for submitting this operation (step 402). (It can do this by again, checking the resource A). Looking at FIG. 3, the resource A last used GPU Engine Gfx X and the current resource A being considered will use Gfx Z, so again the answer is NO. If YES, the driver would proceed to step 415 as before and update the resource object.

Since the answer was NO in step 420, at step 425, a determination is made whether there exists a semaphore object in the wait bucket that has the same GPU Engine as this resource. This is the first introduction of the wait bucket 390, which may be a storage area for the semaphore objects 200 before considering each semaphore object left in the wait bucket 390 at step 450 in the flow chart. Returning to the point in the flow chart under consideration, the answer to step 425 is NO, because the wait bucket 390 is empty. At step 430, the semaphore object corresponding to resource A 210 is added to the wait bucket 390. At step 415, the resource object A 350 is updated with the semaphore object number 4 (from step 405), GPU Engine Gfx Z, and Timestamp 88, as shown in FIG. 4. At this point, before starting to examine the next resource, the wait bucket 390 has one semaphore object, semaphore object 210, with GPU Engine Gfx X and Timestamp 88.

After step 415, the driver determines if more resources are requested for the operation at step 417. Since resources D and E have also been requested, the answer is YES, and the driver proceeds as before until step 425, where a comparison is made between the semaphore object (210) in the wait bucket and the semaphore object (230) for the current resource (D) being considered, and a determination is made regarding whether their GPU engines the same. Looking at the semaphore objects 210 and 230, the GPU Engines are both Gfx X, and thus the answer is YES.

Proceeding to step 435, a comparison is made between the semaphore objects in the wait bucket 390 and the semaphore object for the current resource being requested 230, and a determination is made whether the current resource's timestamp greater. Again, the semaphore objects compared are 210 and 230, and the semaphore object 230 has a timestamp of 218, which is larger than the timestamp of 213 for semaphore object 210. Thus, at step 440 the wait bucket semaphore object 210 is removed from the wait bucket 390 and replaced with semaphore object 230. At step 415, the resource object D 340 is updated with the semaphore object, GPU Engine, and timestamp to create resource object 360. At this point, the semaphore object 230 is the only semaphore object in the wait bucket 390.

Finally, the driver considers the last resource requested: resource E. The flow through FIG. 5's flowchart proceeds as before until step 425, where a determination is make whether there is a semaphore object in the wait bucket 390 that has the same GPU Engine as this resource E. In this case, the wait bucket 390 contains semaphore object 230 with a GPU Engine Gfx X. The current resource E has a semaphore object 220 with a GPU Engine Gfx Y. Since the GPU Engines are not the same, the answer to step 425 is NO, and semaphore object 220 is added to the wait bucket (step 430). As before the resource object E 330 is updated with the semaphore object, GPU Engine, and timestamp to create resource object 370. At this point, the only semaphore objects in the wait bucket are 220 and 230.

Having considered all of the resources, the answer to step 417 is NO. The driver now determines if there is a semaphore object in the wait bucket (step 450). If NO, the procedure skips to step 465; if YES, the corresponding semaphore object is removed from the wait bucket and updated at step 455. In FIG. 4, these updated semaphore objects are 220a and 230a, which now have GPU Engine and timestamp of Gfx Z and 88. For each of these, a command packet (wait) is inserted in the ring frame 500 by the driver (step 460). The command packet (wait) 505 corresponds to semaphore object 230a and the command packet (wait) 510 corresponds to semaphore object 220a. These command packet (wait)s, in this instance, direct a wait.

A command packet with a link to an indirect buffer 515 for the operation may be then inserted (step 465). Such an indirect buffer 235 may instruct a GPU to carry out the operation. Then the command packet (signal) 520 corresponding to the semaphore object 240a is inserted, indicated completion of the resources (step 470), followed by a command packet marking the timestamp 88, 530 (step 480). Finally, the ring frame 500 may be submitted to the GPU Engine for execution 490.

Although not shown, at this point, the wait bucket 390 should then be cleared, as each object in the wait bucket 390 was removed at step 455.

From reviewing the logic in FIG. 5, it may be apparent that there are two loops. One resource processing loop comprises steps 409, 410, 415, 420, 425, 430, 435, and 440. The other may be considered a wait command loop comprising steps 450, 455, and 460.

It should be understood that many variations are possible based on the disclosure herein. Although features and elements are described above in particular combinations, each feature or element may be used alone without the other features and elements or in various combinations with or without other features and elements The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing an operation using a plurality of resources comprising:
   requesting an operation performed by a requested resource;
   populating a ring frame with an indirect buffer command packet corresponding to the operation using a method comprising:
   for the resource requested to perform the operation, creating a semaphore object with a resource identifier and timestamp, in the event that the requested resource is found to be unavailable;
   updating a free semaphore object with the resource requested and timestamp;
   checking if a previous semaphore object corresponding to the resource requested has an expired timestamp,
   wherein a previous operation has taken place and created the previous semaphore object,
   wherein if the timestamp is expired, the updated semaphore object is added to a wait bucket and a resource object is updated with a free semaphore object identification, resource identifier, and timestamp;
   inserting a command packet (wait) into the ring frame, wherein the command packet (wait) corresponds to the semaphore object; and
   submitting the ring frame to an engine.

2. The method of claim 1, further comprising inserting a command packet with the timestamp into the ring frame.

3. The method of claim 1, further comprising checking if the resource requested is the same as a resource previously requested.

4. The method of claim 1, wherein the creating, populating, and submitting steps are done by a graphics driver.

5. A method for performing an operation using a plurality of resources comprising:
   requesting an operation performed by a requested resource;
   populating a ring frame with an indirect buffer command packet corresponding to the operation using a method comprising:
   for the resource requested to perform the operation, creating a semaphore object with a resource identifier and timestamp, in the event that the requested resource is found to be unavailable;
   updating a free semaphore object with the resource requested and timestamp;
   checking if a previous semaphore object corresponding to the resource requested has an expired timestamp,
   wherein a previous operation has taken place and created the previous semaphore object,
   comparing a semaphore object in a wait bucket with the previous semaphore object corresponding to the requested resource and determining if the resource identifications in the semaphore object in the wait bucket and the previous semaphore object are the same;
   inserting a command packet (wait) into the ring frame, wherein the command packet (wait) corresponds to the semaphore object; and
   submitting the ring frame to an engine.

6. The method of claim 5, wherein if in response to the determination, if the resource identifications are the same, or if there is no semaphore object in the wait bucket, a semaphore object corresponding to the requested resource is added to the wait bucket and a resource object is updated with the free semaphore object, resource identifier, and timestamp.

7. The method of claim 5, wherein if in response to the determination, the requested resource is the same, comparing previous semaphore objects in the wait bucket corresponding to the requested resource with the previous semaphore object corresponding to the requested resource, and determining if the requested resource's timestamp is greater than the timestamp for semaphore object in the wait bucket corresponding to the requested resource.

8. The method of claim 7, wherein if the determination is no, the semaphore object corresponding to the requested resource is added to the wait bucket and a resource object corresponding to the requested resource is updated with the free semaphore object, resource identifier, and timestamp.

9. The method of claim 7, wherein if the determination is yes, the semaphore object corresponding to the requested resource replaces the semaphore object previously corresponding to the requested resource and the semaphore object corresponding to a requested resource is added to the wait bucket, and the resource object is updated with the free semaphore object, resource graphics engine, and timestamp.

10. The method of claim 9, wherein restarting a requesting the operation for each resource requested.

11. The method of claim 10, wherein each semaphore object in the wait bucket is updated with the graphics engine and timestamp.

12. The method of claim 11, wherein the step of inserting a command packet (wait) into the ring frame occurs for each of the updated semaphore objects.

13. A system, comprising:
   a driver in communication with multiple engines, wherein on receipt of an operation request that requires resources corresponding to a graphics engine, for the requested operation:
   creating a semaphore object with a corresponding graphics engine and timestamp, populating a ring frame with command packets corresponding to the operation;
   for the resource requested to perform the operation, creating a semaphore object with a graphics engine identifier and timestamp, in the event that the resource is found to be unavailable;
   updating a free semaphore object with the resource requested and timestamp:
   checking if a previous semaphore object corresponding to the resource requested has an expired timestamp,
   wherein a previous operation has taken place and created the previous semaphore object,
   wherein if the timestamp is expired, the updated semaphore object is added to a wait bucket and a resource object is updated with a free semaphore object identification, resource identifier, and timestamp:

inserting a command packet (wait) into the ring frame, wherein the command packet (wait) corresponds to the semaphore object; and submitting the ring frame to a processing unit.

* * * * *